CRYSTAL DIODE AND METHOD OF MAKING SAME

Filed Nov. 16, 1953

INVENTOR
CARL E. ATKINS
BY
Eyre, Mann & Barrows
ATTORNEYS

United States Patent Office 2,722,638

Patented Nov. 1, 1955

2,722,638

CRYSTAL DIODE AND METHOD OF MAKING SAME

Carl E. Atkins, Bloomfield, N. J., assignor to Tung-Sol Electric Inc., Newark, N. J., a corporation of Delaware Application November 16, 1953, Serial No. 392,263

5 Claims. (Cl. 317—236)

The present invention relates to crystal diodes of the type wherein a fine wire, called a "whisker" has rectifying contact with the surface of a crystal of germanium or the like and comprises an improved diode construction that can be readily manufactured on commercial scale by relatively unskilled labor, that is not subject to damage from moisture and that does not change in electrical characteristics with use or handling. The new diode construction of the preferred embodiment of the invention is particularly suited for use in ultra high frequency circuits where uniformity of lead capacity is essential. Crystal diodes, as heretofore constructed, comprised two generally aligned support or lead wires, one carrying a mounted crystal and the other carrying the whisker, and an envelope, usually tubular, enclosing the crystal and whisker and secured to the leads beyond the elements supported thereby. With this prior art construction the whisker was not immobilized and the resulting freedom of the whisker at its point of contact with the crystal has been considered as essential for proper operation of the diode. Except in relatively costly constructions of prior art diodes, either the material used for the envelope or that used for mounting the envelope on the support wires, was not impervious to air and consequently changes in electrical characteristics occurred with changes in the relative humidity or when the diodes were subjected to acid fumes.

Applicant has found, contrary to the prevalent belief of those skilled in the art, that it is not essential that the whisker be free to move, and that superior and more reproducible results are obtained if the whisker is immobilized in a suitable plastic after optimum contact conditions have been established. Accordingly, the new diode construction is one in which the electrodes are maintained in fixed relation by means of a heat cured synthetic resin which is also impervious to moisture. A glass bead, fused about the leads, provides supports therefor during adjustment of contact conditions prior to encapsulation in the resin and prevents leakage of moisture along the leads. In the preferred embodiment of the invention the assembly comprising the heat cured resin bonded to the glass bead and having the crystal and whisker embedded therein and short sections of the support wires to which terminals have been welded is encased in a synthetic resin which has been cured and molded to a convenient shape for installation in ultra high frequency circuits.

For a better understanding of the invention and of specific embodiments thereof, reference may be had to the accompanying drawing of which:

Figure 1:
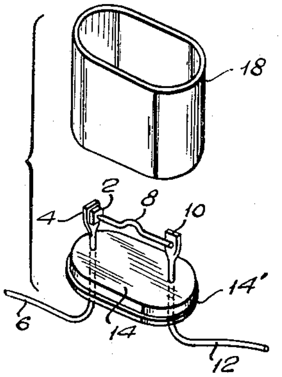
Fig. 1 is an exploded view of parts of crystal diode embodying the invention and explanatory of the manufacture thereof.
Figure 2:
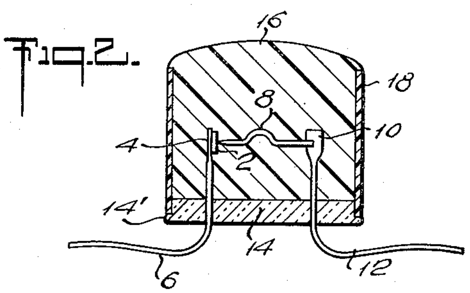
Fig. 2 shows in vertical sections a completed diode utilizing the parts shown in Fig. 1.

The diode of Fig. 2 comprises a crystal 2 of germanium or the like, which is soldered flush against the flattened end 4 of a support lead 6 and a whisker 8 which is welded at one end to the flattened end 10 of a support lead 12 and has rectifying point contact at its other end with the crystal 2, the planes of the flattened ends 4 and 10 of the leads being relatively perpendicular. A glass bead 14 is fused about the leads 6 and 12 adjacent the flattened ends thereof and solidified about and completely embedding the electrodes is a block 16 of a thermoset resin which adheres firmly to the surface of the bead 14 and to an enclosing plastic resin sleeve 18, preferably of nylon. The block 16 is preferably of a cured epoxy resin of the type sold under the name Araldite by Ciba Co. Inc., New York, N. Y.

In manufacturing the above described crystal diode, a short length of glass tubing is fused about two wires to form the glass bead 14 with its shoulder 14'. After the wires have been cleaned by acid, or the like, the end of one is flattened to provide the area 4 upon which the crystal is to be mounted. The crystal is then soldered to the flattened portion 4 and the whisker 8 is secured to the other wire by a welding operation which simultaneously forms the flattened end 10 thereof and cuts off the wire beyond the flattened portion. The structure at this point is then connected in a testing circuit and optimum contact conditions established. The sleeve 18 of nylon, or the like, is then slid down over the assembly of whisker and crystal to rest upon the ridge 14' of the bead 14. Liquid uncured Araldite resin is then inserted into the sleeve 18 as by an injection needle, or the like, to fill the sleeve and form a meniscus across the top thereof. The assembly is then placed in an oven and heated to a temperature of about 150° C. for about 24 hours to cure and solidify the resin. The resin solidifying about the crystal and whisker does not disturb the contact conditions previously established. It firmly seals the nylon sleeve to the glass bead, immobilizes the crystal and whisker and protects them from moisture. Preferably, to avoid the effect of light upon the rectifying action of the diode, a suitable pigment such as colloidal carbon should be incorporated in the uncured resin to render the cured resin opaque to light.

The above described diode of Fig. 2 is suitable for use in any circuit, irrespective of the operating frequency of the circuit. However, when used in very high frequency circuits the capacity between the leads may vary with change in disposition or length of the leads and hence the diode should be carefully connected into such a circuit to minimize variation in capacity effects.

Figure 3:
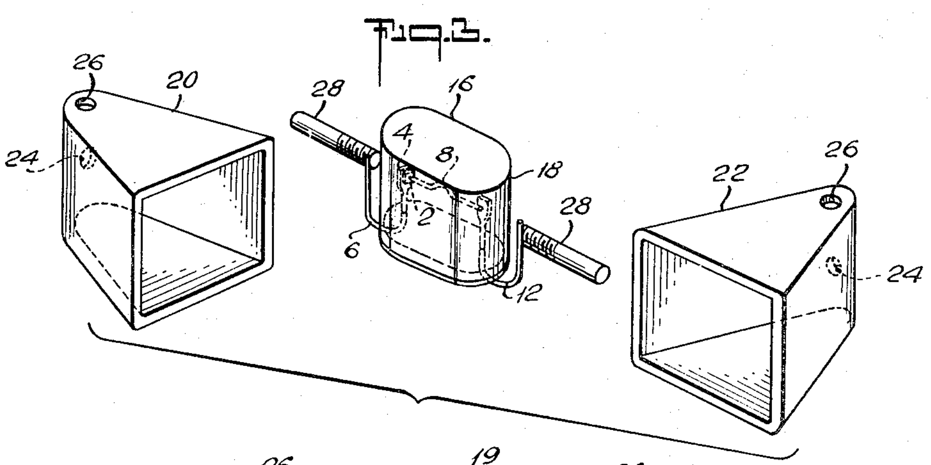
Fig. 3 is an exploded view of parts of a double encapsulated diode representing the preferred embodiment of the invention.
Figure 4:
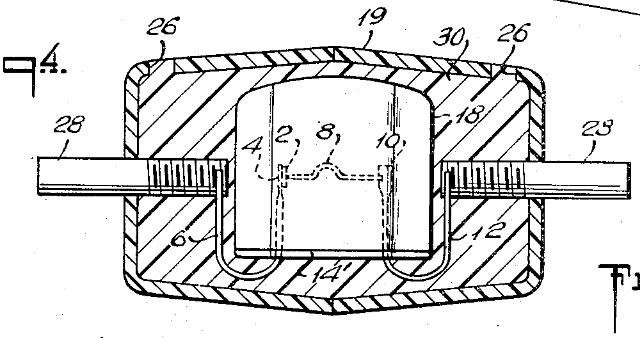
Fig. 4 shows in vertical section the completed diode of Fig. 3.

The embodiment of the invention illustrated in Figs. 3 and 4, is particularly designed for use in very high frequency circuits as variation in capacity between the leads is prevented by immobilization of the leads in plastic. In this embodiment of the invention, the diode of Fig. 2 is embedded in a cured resin contained within an outer shell 19, also preferably of nylon. The outer shell is formed of two like molded parts 20 and 22, of generally wedge shape, each provided with a hole 24 at the midpoint of the apex and with a hole 26 adjacent the apex of the upper wall. The holes 24 are for reception of pins 28 which, after completion of the device, serve as electrical terminals. One end of each pin 28 is preferably threaded or otherwise roughened to provide a surface to which resin during the curing operation will adhere with tenacity. The leads 6 and 12 of the diode of Fig. 2 are welded to the threaded ends of the pins 28 as shown in Fig. 3. The diodes and pin terminals are then enclosed within the nylon molds 20 and 22 with the free ends of the pins 28 extending through the holes 24. With the mouths of the molds 20 and 22 in engagement, a quick-curing synthetic resin as, for example, a resin of the same general type employed for the block 16 but of a shorter curing time and lower curing temperature is inserted through one of the holes 26, the other hole 26 being left free for escape of air from the enclosure. The assembly is then placed in an oven to cure and solidify the resin and to unit thereby the two nylon molds 20 and 22. The double encapsulated diode of Fig. 4 is well adapted for use in high frequency circuits. The crystal and whisker are protected from moisture or acid fumes by the resin forming the block 16 and leakage along the leads is prevented by the cured resin 30 enclosed within the outer jacket 19 in which is firmly embedded the short sections of the leads. The immobilization of these leads ensures against change in capacity and, furthermore, renders the device extremely mechanically stable and relatively insensitive to temperature variations.

Figure 5:
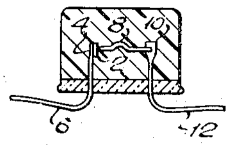
Fig. 5 is a vertical sectional view of a diode similar to that of Fig. 2 but representing a modified form of the invention.

In Fig. 5, a diode of the same general type is that of Fig. 2 but formed without the nylon sleeve 18, is illustrated. In this embodiment of the invention, the crystal and whisker are embedded in a resinous block 16 of Araldite, or the like, which has been cured while contained in a gelatine capsule, the capsule being removed after the resin has solidified. This construction, like that of Fig. 2 immobilizes the whisker and crystal and ensures a practical and relatively economical diode for general purposes. For very high frequency applications the diode of Fig. 5 can be encapsulated in resin as in the construction of Fig. 4, by providing pin terminals welded to the leads.

Figure 6:
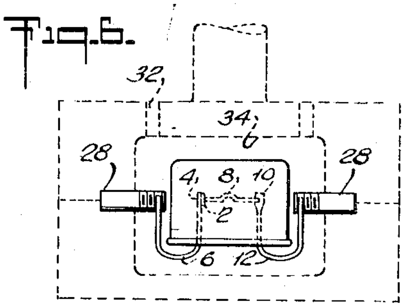
Fig. 6 shows the diode of Fig. 5 in the process of being embedded in an outer resinous sheath.

Double encapsulation of the diode of Fig. 2 or that of Fig. 5 can be effected without use of an outer nylon shell. Such an arrangement is illustrated diagrammatically in Fig. 6 wherein a suitable type of mold for formation of a double encapsulated diode is shown in dotted lines. Fast curing epoxy resin is introduced through an opening 32 into the chamber 34 within which an encapsulated diode of the invention is supported by the pins 28. After heat curing of the introduced resin, the mold parts are removed and the solidified resin ground down to any desired outer contour. The mold should be of material to which the resin will not stick during curing. For epoxy resins such as Araldite, a suitable mold material is the tetrafluoroethylene polymer commercially obtainable from the du Pont de Nemours Company under the trade name Teflon.

The invention has now been described with reference to several embodiments thereof. It will be apparent that the new diode of the invention lends itself to ready manufacture by mass production methods and that the new diode, whether singly or doubly encapsulated is durable, relatively shock-proof, and moisture and acid proof. Obviously the invention is not concerned with the particular outer configurations of the diodes. Those illustrated in the drawing are, however, convenient from the standpoint of space requirements, it being ordinarily desirable to provide very small devices. It will be understood that the drawing illustrates the new diodes on an exaggerated scale, the actual length of the shell 19 of the diode of Fig. 4, for example, being about 7/16 of an inch, and the greatest dimension of the diode of either Fig. 2 or Fig. 3 being under 1/4 of an inch.

The following is claimed:

1. A crystal diode comprising a vitreous bead, a pair of lead wires extending through and fused to said bead, said wires terminating adjacent said bead in flattened areas disposed in mutually perpendicular planes, a crystal mounted on the flattened end of one lead, a whisker mounted on the flattened end of the other lead and contacting said crystal and a thermoset resin completely embedding said whisker and crystal and adhering to said bead.

2. The diode according to claim 1 including a plastic sleeve surrounding said resin and sealed thereby to said bead.

3. The diode according to claim 1 wherein said resin is a slow curing epoxy resin and wherein electrical terminal members are connected to the other ends of said leads and said bead, resin, parts embedded therein, leads and lengths of said terminal members are all encapsulated in a quick curing resin to provide a double encapsulated diode for ultra high frequency applications.

4. The diode according to claim 1 wherein said resin is an epoxy resin and wherein a nylon sleeve surrounds said resin and is sealed thereby to said bead.

5. A crystal diode according to claim 1 including a nylon sleeve surrounding said resin and sealed thereby to said bead, terminal members welded to ends of said leads, a nylon casing enclosing said bead, leads, sleeve, resin and parts embedded therein, said casing being provided with apertures through which said terminal members protrude, and a cured resin filling the remaining space within said casing, immobilizing the parts therein and sealing said terminal members to said casing.

References Cited in the file of this patent

UNITED STATES PATENTS

| | | |
|---|---|---|
| 2,586,609 | Burke | Feb. 19, 1952 |
| 2,595,475 | McLaughlin | May 6, 1952 |